US012728364B2

(12) United States Patent
Fassbender et al.

(10) Patent No.: US 12,728,364 B2
(45) Date of Patent: Sep. 8, 2026

(54) TOY FOR PLAYING BACK MUSIC OR A SPOKEN STORY

(71) Applicant: TONIES GMBH, Düsseldorf (DE)

(72) Inventors: Patric Fassbender, Düsseldorf (DE); Marcus Stahl, Düsseldorf (DE); Christian Wilmanns, Kaarst (DE); Sven Vaders, Düsseldorf (DE); Roman Salomon, Ratingen (DE)

(73) Assignee: TONIES GMBH, Düsseldorf (DE)

( * ) Notice: Subject to any disclaimer, the term of this patent is extended or adjusted under 35 U.S.C. 154(b) by 0 days.

(21) Appl. No.: 18/868,414

(22) PCT Filed: May 25, 2023

(86) PCT No.: PCT/EP2023/064059

§ 371 (c)(1),
(2) Date: Nov. 22, 2024

(87) PCT Pub. No.: WO2023/227718

PCT Pub. Date: Nov. 30, 2023

(65) Prior Publication Data

US 2025/0339786 A1 Nov. 6, 2025

(30) Foreign Application Priority Data

May 25, 2022 (EP) .................................... 22175526

(51) Int. Cl.
*A63H 5/00* (2006.01)
*A63H 33/26* (2006.01)
(Continued)

(52) U.S. Cl.
CPC ............... *A63H 5/00* (2013.01); *A63H 33/26* (2013.01); *F21V 23/0442* (2013.01);
(Continued)

(58) Field of Classification Search
None
See application file for complete search history.

(56) References Cited

U.S. PATENT DOCUMENTS 10,583,370 B2 3/2020 Fattal
2004/0214642 A1 10/2004 Beck
(Continued)

FOREIGN PATENT DOCUMENTS

WO 2008/013356 A1 1/2008
WO 2008/108512 A1 9/2008
WO 2015/104222 A1 7/2015

OTHER PUBLICATIONS

International Search Report for PCT/EP2023/064059 dated Aug. 23, 2023.

(Continued)

*Primary Examiner* — Ifedayo B Iluyomade
(74) *Attorney, Agent, or Firm* — Sughrue Mion, PLLC

(57) ABSTRACT

The invention relates to a toy for playing back music or a spoken story with a loudspeaker and/or a loudspeaker connection, a first sensor which can detect, within an area of its environment, a property or a change in a property of this environment, wherein the first sensor is a reader for communicating with a passive RFID transponder and/or for communicating with an active RFID transponder, and a control unit which can control the loudspeaker or the loudspeaker connection to play back music or a spoken story if the first sensor detects, within the area of its environment, a specific property or a specific change in a property of this environment or if the control unit detects a specific change in the property detected by the first sensor, wherein a second sensor can determine the direction of a magnetic field acting on the second sensor relative to a preferred direction.

14 Claims, 7 Drawing Sheets

(51) Int. Cl.

| | |
|---|---|
| ***F21V 23/04*** | (2006.01) |
| ***F21Y 103/33*** | (2016.01) |
| ***F21Y 115/10*** | (2016.01) |
| ***G01D 5/14*** | (2006.01) |
| ***G06K 19/07*** | (2006.01) |

(52) U.S. Cl.

CPC ......... *G01D 5/142* (2013.01); *G06K 19/0728* (2013.01); *F21Y 2103/33* (2016.08); *F21Y 2115/10* (2016.08)

(56) References Cited

U.S. PATENT DOCUMENTS

2006/0068366 A1 3/2006 Chan et al.
2019/0030452 A1 * 1/2019 Farßender .............. A63H 33/26

OTHER PUBLICATIONS

International Search Report for PCT/EP2023/064061 dated Aug. 11, 2023 (PCT/ISA/210).
U.S. Appl. No. 18/868,354, filed Nov. 22, 2024.
Korean Office Action issued Jun. 4, 2026, in Application No. 10-2024-7040393.

* cited by examiner

B, C
8
4
20
16
17
13
A, D
14

B, C
8
20
4
17
13
A, D
14

B, C
20
8
4
17
13
A, D
14

TOY FOR PLAYING BACK MUSIC OR A SPOKEN STORY

CROSS REFERENCE TO RELATED APPLICATIONS

This application is a National Stage of International Application No. PCT/EP2023/064059 filed May 25, 2023, claiming priority based on European Patent Application No. 22175526.7 filed May 25, 2022.

The invention relates to a toy for playing back music or a spoken story. The invention also relates to a system comprising such a toy and a magnet carrier.

A toy for playing back music or a spoken story is known from WO 2015/104222 A1. The toy described there comprises a loudspeaker or a loudspeaker connection. Further, the toy described there comprises a sensor which can detect, within an area of its environment, a property or a change in a property of this environment, wherein this sensor can be a reader for communicating with a passive RFID transponder and/or for communicating with an active RFID transponder. The toy described there further comprises a control unit which can control the loudspeaker or the loudspeaker connection to play back music or a spoken story if the first sensor detects, within the area of its environment, a specific property or a specific change in a property of this environment or if the control unit detects a specific change in the property detected by the first sensor. In the preferred embodiments described there, the toy can also comprise a proximity sensor, a motion sensor (acceleration sensor), a sensor for ambient light, a humidity sensor, a tilt sensor, a GPS sensor and/or a gyroscopic sensor. In particular, WO 2015/104222 A1 describes the possibility of generating further operating commands for the control unit with such sensors. It is proposed there that shaking can be recognized and an operating signal for the control unit can be generated from this. The shaking of the device can be used to play back data of different audio information in random order. A device configured in this way can also recognize whether a light blow is being applied to the device from the left or right. This can be used, for example, to jump to the next chapter or to a previous chapter within a data set. Similarly, according to the proposals of WO 2015/104222 A1, a device configured in this way can recognize whether it is being thrown and generate an operating signal from this. WO 2015/104222 A1 also describes that a device equipped in this way can recognize whether it is being tilted vertically or whether it is being tilted horizontally. These signals can also be used to generate operating signals for the control unit according to the proposals of WO 2015/104222 A1. It is proposed there that a vertical tilt can be used for navigating within a playlist, while a horizontal tilt enables switching between applications.

Despite the wide range of further development options which are described in WO 2015/104222 A1, the need has arisen for toys of the type described in more detail in WO 2015/104222 A1 to supplement the already known operating concepts with an operating concept that can be realized without changing the position of the toy, i.e. without tilting the toy or without tapping on the toy. There is also a need for an operating concept that is only available in specific operating situations and is not available in other operating situations.

This problem is solved by the toy, the system, the method, and the use according to the present disclosure. Advantageous embodiments are specified in the present disclosure .

The invention is based on the basic idea of equipping the toy, in addition to a first sensor known from the prior art, which is a reader for communicating with a passive RFID transponder and/or for communicating with an active RFID transponder, with a further, second sensor which can determine the direction of a magnetic field acting on the second sensor relative to a preferred direction. By this development of the toy known from the prior art, it is made possible to act on the second sensor with a magnet brought to the toy from the outside and, by selecting a specific position of the magnet relative to the toy, to cause the second sensor to generate a signal that depends on the position of the magnet relative to a preferred direction. Such a signal generated by the second sensor can be used to control the control unit.

In a preferred embodiment, the second sensor is configured to determine only the direction of a magnetic field acting on it, which has a magnetic field strength in the second sensor that is above the magnetic field strength of the earth's magnetic field. It is assumed that the earth's magnetic field has a magnetic field strength of approx. 30 microtesla (μT) at the equator and an amount approximately twice as large (approx. 60 μT) at the poles, while in Central Europe it is about 48 μT. In order not to be affected by the earth's magnetic field, the second sensor is particularly preferably configured such that it can determine the direction of the magnetic field acting on it relative to a preferred direction only for such magnetic fields if this magnetic field has a magnitude of more than 100 μT, preferably more than 1000 μT, preferably more than 0.01 T. The development according to the invention of the toy known from the prior art thus does not serve to determine the direction of the earth's magnetic field relative to a preferred direction, but to determine a magnet brought into the vicinity of the toy which generates a recognizably stronger magnetic field than the earth's magnetic field.

In a preferred embodiment, the second sensor is a Hall sensor. The preferred direction typically results from the design of the Hall sensor. Particularly preferably, the Hall sensor comprises a housing that can be connected to a circuit board. The Hall sensor provides a signal that depends on how a magnetic field acting on the Hall sensor from the outside is oriented relative to the housing. If the housing of the Hall sensor is thus installed fixedly in the toy, for example if a circuit board, on which the Hall sensor is installed fixedly, is installed fixedly in the toy, the Hall sensor can provide a signal that depends on how a magnetic field acting on the Hall sensor from the outside is oriented relative to the toy.

In a preferred embodiment, the toy comprises a support. In a preferred embodiment, the outwardly facing surface of the support forms a part of the outer surface of the toy. In a preferred embodiment, the outwardly facing surface of the support is distinct from further surfaces of the toy surrounding the support. In a preferred embodiment, the support is manufactured from a different material than materials used to provide the surface portions of the toy surrounding the support. For example, a preferred embodiment is conceivable in which the toy comprises an outer casing made of foamed material, wherein the foamed material is in turn encased by an outer skin, wherein the outer skin is leather or artificial leather or a soft plastic casing, while the support is formed by a solid plastic, wherein the support is preferably inserted into a recess in the foamed material. By the different design of the support from the other surface sections of the toy surrounding the support, the support can be emphasized for the operator. This different design makes it clear to the operator where the support is located. In other embodiments, the support can also be emphasized by a different surface structure in relation to the surface sections surrounding it, for example by a rough surface structure if the surface sections surrounding it are smooth, or by a smooth surface structure if the surface sections surrounding it are rough. It is also conceivable to emphasize the support by a coloring. The support can also be made visible by shaping the surface sections of the toy surrounding the support, for example by the support being part of a hollow, e.g. the support being the base area of a hollow.

In a preferred embodiment, the second sensor is arranged below the support. In a preferred embodiment, the support is formed by an outwardly facing surface of a plate-like body, wherein the second sensor is attached to the plate-like body. In an alternative embodiment, a conductor board (a circuit board, a printed circuit, a "printed circuit board" (PCB)) is provided below the support, wherein the second sensor is arranged on this conductor board.

In a preferred embodiment, at least a part of the first sensor is arranged below the support. In a preferred embodiment, the support is formed by an outwardly facing surface of a plate-like body, wherein at least a part of the first sensor is attached to the plate-like body. In an alternative embodiment, a conductor board (a circuit board, a printed circuit, a "printed circuit board" (PCB)) is provided below the support, wherein at least a part of the first sensor is arranged on this conductor board.

In a preferred embodiment, the first sensor comprises an antenna and an evaluation unit connected to the antenna. In a preferred embodiment, the evaluation unit of the first sensor is arranged below the support. In a preferred embodiment, the support is formed by an outwardly facing surface of a plate-like body, wherein in this preferred embodiment the evaluation unit of the first sensor is attached to the plate-like body. In an alternative embodiment, a conductor board (a circuit board, a printed circuit, a "printed circuit board" (PCB)) is provided below the support, wherein the evaluation unit of the first sensor is arranged on this conductor board. In a preferred embodiment, the antenna of the first sensor is provided at the plate-like body and the evaluation unit of the first sensor is arranged on a conductor board provided below the plate-like body, wherein the antenna is particularly preferably provided at the plate-like body at least partially circumferentially around the support, preferably completely circumferentially around the support.

In a preferred embodiment, a conductor board (a circuit board, a printed circuit, a "printed circuit board" (PCB)) is provided below the support, wherein the first sensor and the second sensor and preferably the first sensor and the second sensor and the control unit are arranged on this conductor board. In an alternative, likewise preferred embodiment a first conductor board (a circuit board, a printed circuit, a "printed circuit board" (PCB)) is provided below the support, wherein at least a part of the first sensor, preferably an evaluation unit of a first sensor comprising an antenna and an evaluation unit, is arranged on the first conductor board, and a second conductor board (a circuit board, a printed circuit, a "printed circuit board" (PCB)) is provided below the support, wherein the second sensor is arranged on the second conductor board.

In a preferred embodiment, the second conductor board is arranged closer to the support than the first conductor board. In a preferred embodiment, the first conductor board is arranged at an angle to the second conductor board, preferably at an angle between 75° and 105°, preferably perpendicular. In a preferred embodiment, the support is formed by an outwardly facing surface of a plate-like body, wherein the second conductor board extends parallel to the outwardly facing surface of the plate-like body and the first conductor board extends at an angle between 75° and 105°, preferably perpendicular to the outwardly facing surface of the plate-like body.

In a preferred embodiment, the control unit is provided on the conductor board (a circuit board, a printed circuit, a "printed circuit board" (PCB)), on which at least a part of the first sensor, preferably an evaluation unit of a first sensor comprising an antenna and an evaluation unit, is also provided. Preferably, the control unit is arranged on the first conductor board.

In a preferred embodiment, the toy comprises a head plate. In a preferred embodiment, the head plate forms the upper end of the toy. In a preferred embodiment, the support is designed as part of the head plate. In a preferred embodiment, a conductor board, on which the second sensor is arranged in a preferred embodiment, is connected to the head plate. The use of a head plate has advantages in the manufacture of the toy according to the invention. Thus, a base body of the toy can be manufactured in a separate work step and the head plate can be manufactured in a separate manufacturing step, wherein the head plate is then placed on the base body from above in an assembly step.

In a preferred embodiment, the support is part of a hollow. In an embodiment in which the toy according to the invention comprises a head plate, the head plate can have a depression or recess which can be used as a hollow. In a preferred embodiment, the support has a diameter or a largest cross section of from 15 mm to 150 mm, preferably from 30 mm to 100 mm, preferably from 50 mm to 100 mm. In a preferred embodiment, the support is designed as part of a hollow. Preferably, the hollow is circular. Preferably, the hollow has a diameter of from 15 mm to 150 mm, preferably from 30 mm to 100 mm, preferably from 50 mm to 100 mm. In a preferred embodiment, the hollow has a depth of from 0.3 mm to 5 mm, preferably from 0.3 mm to 3 mm, preferably from 0.5 mm to 1.5 mm.

In a preferred embodiment, the support comprises a recess or a dent. In a preferred embodiment, the diameter of the recess or of the dent, in the case of a circular recess or a circular dent, or the largest cross section of the recess or of the dent, in the case of a recess or a dent that is not circular, is smaller by a multiple, in particular by the multiple of five, particularly preferably by the multiple of ten, particularly preferably by the multiple of fifteen, than the diameter of the support, in the case of a circular support, or the largest cross section of the support, in the case of a support that is not circular. A recess or dent can be used to position the object to be placed on the support, for example a disk, in its position on the support. If the object to be placed on the support, for example a disk, comprises a protrusion that can engage into the recess or dent, the relative position of the object, for example the disk, relative to the support can be defined by this engagement between protrusion and recess or dent.

In a preferred embodiment, the second sensor is arranged in alignment with the recess or dent below the support. In a preferred embodiment, an axis perpendicular to the outer surface of the support leads through the recess or through the dent and through the second sensor, so that the second sensor is arranged in alignment with the recess or the dent below the support. The recess can be a hole. Preferably, however, the recess is a blind hole or a groove and can thus prevent dirt from entering the inside of the toy from the outside.

In a preferred embodiment, a metal plate is arranged below the support. Such a metal plate can be used to allow objects that are placed on the support, for example a disk or an identifier carrier, to hold on to the support. If the disk or identifier carrier is equipped with magnets, the provision of a metal plate below the support can offer the possibility that by means of the magnets a holding force is generated between the disk or the identifier carrier and the metal plate, with which the disk or the identifier carrier is held on the support.

In a preferred embodiment, the metal plate comprises a hole. In a preferred embodiment, the hole of the metal plate is in alignment with the second sensor. The provision of a hole in the metal plate allows to provide the metal plate directly below the support and to provide the second sensor in turn below the metal plate. However, by the provision of the hole, it is ensured that the second sensor can determine the direction of a magnetic field, which is generated by an object, which is placed on the support, relative to a preferred direction. The hole can be in alignment with a recess or dent possibly provided in the support.

In a preferred embodiment, the metal plate is provided below the support but above the second sensor. This makes it possible to arrange the metal plate as close as possible to the support. Furthermore, this arrangement makes it possible to arrange the second sensor on a conductor board, which can be arranged below the metal plate. In a preferred embodiment, an existing conductor board is arranged below the metal plate and the metal plate is thus arranged between the conductor board and the support.

In a preferred embodiment, the metal plate is circular. In a preferred embodiment, in which the metal plate is provided with a hole, the hole is circular and, in a preferred embodiment, provided in the center of the circular metal plate. In a preferred embodiment, the diameter of the hole is smaller than the diameter of the circular metal plate by a multiple, in particular by the multiple of five, particularly preferably by the multiple of ten, particularly preferably by the multiple of fifteen.

In a preferred embodiment, the support is enclosed by an LED ring. If the support is part of a flat outer surface of a plate-shaped object, the LED ring can be designed to end flush with this outer surface. If the support is formed as part of a hollow, the LED ring can be arranged at the upper edge of the hollow, i.e. at the place where the hollow begins, jumping back inwards. The LED ring can also be part of the side wall of the hollow. The LED ring can also be arranged in the base of the hollow.

In a preferred embodiment, the LED ring is formed from a sequence of individually controllable LEDs. In a preferred embodiment, the individual LEDs can be controlled in such a way that the individual LED lights up in different colors in different operating states. Equipping the LED ring in this way enables operating situations in which the LED ring lights up in one color as a continuous ring. In other operating situations, an LED ring equipped in this way makes it possible to generate dynamic image sequences. For example, a "circulating pixel" can be generated with such an LED ring.

In a preferred embodiment, the control unit can control the LED ring, in particular the individual LEDs of the LED ring, depending on a measurement signal of the second sensor. For example, it is possible to control the LED ring by means of the signal of the second sensor such that the LED ring visualizes the orientation of the magnetic field acting on the second sensor, thus, for example, only the LEDs of the LED ring light up which are in alignment with the line along which the magnetic field acting on the second sensor is oriented.

In a preferred embodiment, the LED ring comprises individual LEDs that can generate light and a light guide designed as a ring (hereinafter: light guide ring) that transmits the light generated by the LEDs. In a preferred embodiment, the LEDs are arranged circularly and the light guide ring is arranged above the circularly arranged LEDs, so that each LED radiates the light it generates at least predominantly, preferably entirely, into a circle segment of the light guide ring assigned to the respective LED. In a preferred embodiment, the light guide ring is manufactured as one piece and has the same light transmission throughout. In an alternative embodiment, the segmentation resulting from the individual LEDs can be taken up in that the light guide ring, in a preferred embodiment, is formed either from circle segment-shaped light guides, which are connected to each other at the ends to form the light guide ring, wherein the individual circle segment-shaped light guides have a poorer light transmission at the ends at which they are connected to each other, so that light radiated into the respective circle segment-shaped light guide radiates through the light guide, but not into adjacent circle segment-shaped light guides. Alternatively, a segmentation can be achieved by subsequently creating in a ring-shaped light guide manufactured as one piece areas in the inside that have poorer light transmission.

In a preferred embodiment, the individual LEDs of the LED ring are arranged on a conductor board (a circuit board, a printed circuit, a "printed circuit board" (PCB)) below the support and the light guide ring is arranged above the LEDs. In a preferred embodiment, the support is enclosed by the light guide ring. If the support is part of a flat outer surface of a plate-shaped object, the light guide ring can be designed to end flush with this outer surface. If the support is formed as part of a hollow, the light guide ring can be arranged at the upper edge of the hollow, i.e. at the place where the hollow begins, jumping back inwards. The light guide ring can also be part of the side wall of the hollow. The light guide ring can also be arranged in the base of the hollow.

In a preferred embodiment, the individual LEDs of the LED ring are arranged on a conductor board (a circuit board, a printed circuit, a "printed circuit board" (PCB)) below the support and the second sensor is arranged on the same conductor board or on a separate conductor board which is connected to the conductor board on which the individual LEDs are arranged. In a preferred embodiment, the LEDs are not arranged on the conductor board on which the first sensor or an evaluation unit of the first sensor is arranged.

One field of application of the invention is the playback of audio information, in particular pieces of music, spoken texts or the combination of pieces of music and spoken texts. This audio information particularly preferably has a playback duration of at least 10 s, preferably of more than 15 s, particularly preferably of more than 20 s and particularly preferably of more than 25 s. In a particularly preferred embodiment, it is even provided that the playback duration of the audio information can last at least 30 s and particularly preferably more than 1 min. For example, radio plays, which are particularly preferably to be played back with the invention, often have a length of more than 5 min, sometimes of up to 30 min or even more. The audio information to be played back according to the invention is in particular not a confirmation signal. In particular, the audio information to be played back according to the invention is not an acknowledgement tone that can be emitted, for example, if a first object has been correctly oriented relative to a second object. Similarly, the audio information is particularly preferably not a jingle which is played if a first object is brought into the vicinity of a second object or is brought into a predetermined, specific position relative to the second object. The invention is concerned with the audio information whose playback duration lasts longer, as is the case with pieces of music or spoken texts. The audio information is particularly preferably such audio information, during the play back of which a non-periodic sequence of different tones is played back.

The loudspeaker of the toy according to the invention is particularly preferably a transducer that can convert electrical signals into mechanical oscillations (sound). Instead of a loudspeaker or in addition to a loudspeaker, the toy according to the invention can also comprise a loudspeaker connection, for example a Speakon, XLR connection or, for example, a 6.35 mm jack socket. By controlling the loudspeaker connection, the control unit can, in the case of a loudspeaker being connected to the loudspeaker connection, also control that loudspeaker.

In a preferred embodiment, the toy according to the invention comprises at least two loudspeakers so that playback of the audio information in stereo is made possible.

In a preferred embodiment, the toy comprises a memory in which data is stored, due to which the control unit can control the loudspeaker to play back the audio information. The data particularly preferably contain the audio information in the specific data format, for example an MP3 format or a WAV format. Embodiments are conceivable in which the memory only comprises data of a single piece of audio information. In such an embodiment, the toy according to the invention can be used to play back, in the event of adjusting the property of the area of the environment of the first sensor accordingly or adjusting the change in the property of the area of the environment of the first sensor accordingly, a single piece of audio information, the playback of which lasts particularly preferably at least 10 s. In a preferred embodiment, data of different audio information is stored in the memory. In such an embodiment, the control unit is particularly preferably configured such that, if the first sensor detects, within the area of its environment, a specific first property or a specific first change in a property of this environment or the control unit detects a specific first change in the property detected by the first sensor, it controls the loudspeaker to play back first audio information, the playback of which lasts particularly preferably at least 10 s, while the control unit controls the loudspeaker to play back second audio information, the playback of which particularly preferably lasts at least 10 s, if the first sensor detects, within the area of its environment, a specific second property or a specific second change in a property of this environment or the control unit detects a specific second change in the property detected by the first sensor. This makes it possible to stipulate, by means of the specific influencing of the property of the area of the environment of the first sensor or by a specific influencing of the change in the property of this environment of the first sensor, which audio information of a plurality of audio information the toy plays back. For example, the toy can play back specific first audio information if the presence of a first RFID transponder is detected in the area of the environment of the first sensor, while the toy can play back second audio information if the presence of a second RFID transponder is detected in the area of the environment of the first sensor.

In a preferred embodiment, the data of a piece of audio information is stored as a data set with separately readable data sequences, for example to play back an audio book in the form of individual chapters or to make the individual chapters of an audio book controllable. In a preferred embodiment, each data sequence of a data set can be read out separately and used to control the loudspeaker.

In a preferred embodiment, the toy comprises a unit for receiving data from the Internet and/or for sending data to the Internet, particularly preferably an antenna for a wireless local area network (WLAN), a mobile data radio technology such as, for example, LTE, UMTS or their predecessors or successors, or a connection socket for connecting a cable of a local network that also has Internet access, for example a connection socket for an Ethernet cable. The presence of a unit for receiving data from the Internet makes it possible for the control unit to download the data containing the audio information to be played back in a specific data format from the Internet. In this way, the toy can play audio information that was not stored in the toy before the first sensor detects, within the area of its environment, a specific property or a specific change in a property of this environment or the control unit detects a specific change in the property detected by the first sensor. The control unit can be configured such that it receives the data from the Internet and stores it permanently in a memory and the controlling of the loudspeaker to play back the audio information takes place on the basis of the data stored in the memory. Additionally or alternatively, it is conceivable that the control unit uses the data received from the Internet directly to control the loudspeaker to play back audio information (so-called streaming), wherein this embodiment can also include the temporary buffering of the data received from the Internet in a buffer memory.

In embodiments which receive the data containing the audio information in a specific data format from the Internet, it is conceivable, for example, that the control unit provides in a memory a specific server address of a server connected to the Internet and provides in a memory a table in which a respective specific property or a respective specific change in a property is assigned to a respective identifier number. In such an embodiment, the control unit is then configured to, in the case of recognizing the specific property or the specific change in the property, communicate with the specific server and, using the identification number assigned to the specific property or the specific change in the property, download a specific data set from the server and use it for the controlling of the loudspeaker to play back the audio information resulting from this data. For example, music titles can be stored on the server as data in a specific data format, wherein the respective music title or the data containing this music title is stored on the server under a specific identification code. In a preferred embodiment, the toy according to the invention already contains an assignment table that assigns specific properties or changes in the properties of the area of the environment of the first sensor to some, to a plurality or, in a preferred embodiment, even to all of the identification numbers that are also used on the database of the server. This enables the control unit to specifically download data sets from the server. Alternatively, it is conceivable that the control unit is configured to transmit information containing the detected specific property or the detected specific change in the property to a specific server that is connected to the Internet. The assignment of the recognized specific property or the recognized specific change in the property to specific audio information can then take place on the server. The control unit is then configured to receive data from the server which contain the audio information to be played back. The server transmits the data to the toy which the server has assigned to the specific property transmitted to the server by the control unit or to the specific change in the property transmitted to the server by the control unit. This embodiment avoids the need to provide an assignment table in the toy and thus increases the flexibility of receiving specific data containing the audio information on the basis of a specific detected property or a specific detected change in a property of the area of the environment of the first sensor. Such an embodiment makes it possible, for example, to increase the number of data sets provided on the server without having to adapt an assignment table in the control unit of the toy.

In a preferred embodiment, the control unit is configured to directly control the loudspeaker to play back the audio information. Particularly preferably, no further start signals need to be supplied to the control unit to control the loudspeaker to play back the audio information. However, it is conceivable here that the control unit delays the controlling of the loudspeaker to play back the audio information by means of a delay element.

In a preferred embodiment, the toy is cube-shaped. The toy according to the invention can also have other shapes, for example spherical, or can, for example, take the shape of larger objects that are particularly preferred by children, such as the shape of a ship, a locomotive, a house or an animal, such as an elephant.

In a preferred embodiment, the toy has an operating element in the form of a rocker, with which the volume of the playback of the audio information can be influenced by the rocker sending a first signal to the control unit in a first position, for example a signal to increase the volume of the playback of the audio information, and the rocker sending a second signal to the control unit in a second position, for example a signal to reduce the volume of the playback of the audio information. Furthermore, such a rocker can have a neutral middle position in which no signal affecting the volume is sent to the control unit. Alternatively, it is conceivable that the toy comprises a first operating element with which signals for increasing the volume of the playback of the audio information can be transmitted to the control unit, and the toy comprises a second operating element with which signals for reducing the volume of the playback of the audio information can be sent to the control unit. In a particularly preferred embodiment, the operating element influencing the increase in volume is larger than the operating element influencing the reduction in volume of the playback of the audio information. In a particularly preferred embodiment, the two operating elements have the shape of ears which are attached to a housing of a base body of the toy, for example protrude from the housing. The ear-shaped operating elements can emit the signal to be generated by them to influence the volume of the playback of the audio information when a pressing movement or bending movement is performed. This has the advantage that the user can recognize the function of the operating elements without having to rely on language skills.

In a preferred embodiment, the toy according to the invention comprises a display. In particular, this display can be an e-ink display. The display can also be a touch-sensitive display. Additionally or alternatively, the toy can comprise an LED or a sequence of LEDs.

In a preferred embodiment, the toy comprises a proximity sensor, a motion sensor (acceleration sensor), a sensor for ambient light, a humidity sensor, a tilt sensor, a GPS sensor and/or a gyroscopic sensor. Such sensors make it possible to generate further operating commands for the control unit. For example, a toy designed in this way can recognize shaking and, from this, generate an operating signal for the control unit. For example, shaking the toy can be used to play back data of different audio information in random order. A toy designed in this way can also recognize whether a light blow is being applied to the toy from the left or right. This can be used, for example, to jump to the next chapter or to a previous chapter within a data set. A toy configured in this way can also recognize whether it is being thrown. From this, too, operating signals can be generated.

In a preferred embodiment, the toy comprises a sensor that can generate a signal dependent on the distance between an object placed in the area of the receptacle and the receptacle, for example an ultrasonic sensor. This makes it possible, in a preferred embodiment of the toy, to make the control of the loudspeaker dependent on this signal, for example on the object touching or almost touching the receptacle. Furthermore, in an additional or alternative embodiment, this makes it possible to generate further operating commands in response to a change in the distance. For example, briefly removing and setting the object down again can be used to jump to the next chapter within a data set.

A toy configured in this way can recognize whether it is being tilted vertically or whether it is being tilted horizontally. These signals can also be used to generate operating signals for the control unit. For example, a vertical tilting can be used to navigate within a playlist, while a horizontal tilting makes a switch between applications possible.

In a preferred embodiment, the toy according to the invention comprises a data connection, for example a USB port. Via such a connection, for example, a memory provided as part of the toy in a preferred embodiment can be occupied with data containing audio information. It is also possible to connect the toy according to the invention to a computer via such a connection, for example to configure the software of the toy.

In a preferred embodiment, the toy is encased with foamed material or another elastic material. Particularly preferably, the toy according to the invention is completely encased with foamed material or another elastic material, or in an embodiment with a display, only the area of the display not encased with foamed material or an elastic material. On the one hand, the casing protects the further components of the toy. On the other hand, the casing protects children from injuries.

In a preferred embodiment, the toy according to the invention comprises an energy storage, in particular a battery, particularly preferably a rechargeable battery. In a preferred embodiment, the toy according to the invention is designed such that the battery can be charged wirelessly, for example by means of inductive energy transfer. This offers the advantage that the charging station can be designed child-friendly, for example in the form of a charging tray in which the toy according to the invention must only be placed for charging. This avoids that children have to handle electrical cables in order to charge the battery of the toy according to the invention.

In a preferred embodiment, the toy according to the invention can generate light, for example to function as a night light. In a preferred embodiment, the toy according to the invention comprises a housing in which the first sensor is arranged so wherein the area of the environment of the first sensor in which the first sensor can detect a property or a change in a property of this environment extends no further than 1 m, particularly preferably no further than 150 mm, particularly preferably no further than 100 mm, particularly preferably no further than 50 mm, particularly preferably no further than 10 mm, particularly preferably no further than 5 mm beyond a surface of the housing. This offers the advantage that the property or the change in the property, which the first sensor is to detect so that the control unit controls the loudspeaker to play back the audio information, is only recognized in a narrow area around the housing of the toy. This avoids operating errors.

In a preferred embodiment, the toy is manufactured from incombustible or hardly combustible material.

In a preferred embodiment, the toy comprises a microphone or a connection option for incoming audio signals, for example from a microphone. This makes it possible to control the toy by voice or to make recordings.

Particularly preferably, the toy can be integrated into a wireless local area network via a WLAN antenna and receive control commands via the WLAN antenna, for example be controlled via a smartphone or a PC. In a preferred embodiment, these control commands are not control commands with which the user can influence the start of the playback of the audio information. The toy according to the invention can also be configured to be operated via a remote control. In a preferred embodiment, the toy according to the invention comprises a camera. If the toy according to the invention is designed as a night light, for example, the camera can take over a monitoring function for the child lying next to the toy by allowing the camera to be controlled for example from a smartphone and the image recorded by the camera to be reproduced on a display such as a television, smartphone or other mobile display. Additionally or alternatively, the audio information recorded by a microphone or input via a connection option can be played back on a loudspeaker or smartphone in this way. It is also possible that a toy integrated into a wireless local area network via a WLAN antenna transmits the audio information to be played back to other participants in the network, for example streams it to a television or another loudspeaker.

On the one hand, the invention relates to the toy according to the invention. The toy according to the invention is already a marketable product. By providing the toy according to the invention, third parties can be enabled to achieve the advantages according to the invention by adding a magnet.

However, the invention is also directed to a system comprising a toy according to the invention and a magnet carrier, wherein the magnet carrier has a rotation axis about which the magnet carrier can rotate, and comprises a radially magnetized magnet in which the magnetic axis of the magnet is perpendicular to the rotation axis. In a preferred embodiment, the magnet carrier is a disk. A radially magnetized magnet, in which the magnetic axis of the magnet is perpendicular to the axis of rotation, is understood to be one in which the magnetic axis of the radially magnetized magnet intersects a plane containing the rotation axis. In a preferred embodiment, the magnetic axis of the radially magnetized magnet intersects the rotation axis.

In a preferred embodiment of the system according to the invention, the magnet carrier, in particular the disk provided in a preferred embodiment, rests on a support, in particular on a support of the toy according to the invention formed as part of a hollow.

By providing the magnet carrier, in particular the disk, an object is created by means of which a magnetic field is generated that can act on the second sensor and whose orientation relative to a preferred direction the second sensor can determine.

The magnet carrier provided in the system according to the invention, in particular the disc, has an rotation axis and a radially magnetized magnet in order to create thereby the possibility of rotating the magnet carrier, particularly preferably the disc, about the rotation axis and thereby changing the direction of the magnetic field acting on the second sensor relative to a preferred direction. Thus, in the system according to the invention, by turning the magnet carrier, in particular the disk, a signal detectable by the second sensor or a change in a signal detectable by the second sensor can be generated, that can be used to control the control unit.

In a preferred embodiment, the magnet carrier, particularly preferably the disk, is formed by a geometric body whose shape is rotationally symmetrical with respect to the rotation axis. In a preferred embodiment, the disk is a coin or an ellipsoid. The magnet body can also be formed by two cones or truncated cones, which are each arranged adjacent to each other with their base surfaces.

In a preferred embodiment, the disk has a diameter of more than 15 mm, particularly preferably more than 20 mm, particularly preferably more than 25 mm. In a preferred embodiment, the disk has a diameter of less than 150 mm, particularly preferably less than 120 mm, particularly preferably less than 100 mm. In a preferred embodiment, the disk is sufficiently large so that it is not lost. One field of application of the system according to the invention is as a toy. Here there is a risk that if the disk is too small, the disk will get lost among all the objects that are usually present in a children's playroom. On the other hand, in a preferred embodiment, the disk is so small that it can be easily handled by children's hands, for example also by the hands of a 2- or 3-year-old child. It should also be noted that the disk can also be used to generate operating commands for the control unit by means of rapid rotation on the support or in the hollow. It has been shown that for such operation, the disk must be large enough to be gripped easily and rotated quickly, but small enough not to have too great a moment of inertia around the rotation axis.

In a preferred embodiment, the disc comprises a top side and a bottom side, wherein the radially magnetized magnet is preferably positioned centrally between the top side and the bottom side. In an alternative embodiment, the disc comprises a top side and a bottom side and comprises a first radially magnetized magnet arranged closer to the bottom side and comprises a second radially magnetized magnet arranged closer to the top side. In a preferred embodiment, the magnetic axis of the first radially magnetized magnet is parallel to the magnetic axis of the second radially magnetized magnet. In an alternative embodiment, the magnetic axis of the first radially magnetized magnet is not parallel to the magnetic axis of the second radially magnetized magnet. In an alternative embodiment, the disc comprises a top side and a bottom side and comprises a radially magnetized magnet arranged closer to the bottom side.

Embodiments are conceivable in which the radially magnetized magnet protrudes at the top side or the bottom side of the disc or is attached, for example glued, to the top side or the bottom side of the disc. The protruding of the radially magnetized magnet over the top side or the bottom side of the disc can be used to insert the protruding part of the magnet into a recess or dent in the support of the toy.

The disk can in particular be of plastic or wood or of a metal, preferably a non-magnetic metal.

In a preferred embodiment, the magnet carrier, in particular the disc, comprises, in addition to the radially magnetized magnet, at least one axially magnetized magnet whose magnetic axis runs through the rotation axis or parallel to the rotation axis. In a preferred embodiment, at least two, particularly preferably at least three, particularly preferably at least four, axially magnetized magnets are provided. In a preferred embodiment, less than 100, particularly preferably less than 50, particularly preferably less than 20, particularly preferably less than 10, axially magnetized magnets are provided. In a preferred embodiment, the axially magnetized magnets present are arranged with equal spacing from each other around the rotation axis. In a preferred embodiment, all axially magnetized magnets present are arranged on a circle around the rotation axis and, in a particularly preferred embodiment, have the same spacing from one another in the circumferential direction. If, for example, three axially magnetized magnets are provided, they preferably have an angle of 120° to each other. If four axially magnetized magnets are provided, they have, for example, an angular distance of 90° to each other. The axially magnetized magnets can be used to hold the magnet carrier, in particular the disc, to a metal plate of the toy, which is preferably arranged below the support. In a preferred embodiment, the axially magnetized magnets are selected sufficiently strong to hold the disc at the support and allow, for example, the toy according to the invention to be held overhead with the disc resting on the support without the disc falling off. On the other hand, the strength of the axially magnetized magnets is selected to be low enough to allow the disc to rotate about the rotation axis.

In a preferred embodiment, the radially magnetized magnet is rectangular, particularly preferably square, or elliptical or polygonal. Such a magnet can be inserted into a correspondingly shaped recess of the disc, wherein the shaping prevents the radially magnetized magnet from rotating in the recess. In this way, the orientation of the magnetic field of the radially magnetized magnet relative to the disc is stipulated.

In a preferred embodiment, the radially magnetized magnet has a magnetization of N50. In a preferred embodiment, the radially magnetized magnet has a remanence of 1.00 to 1.5 T.

In a preferred embodiment, the axially magnetized magnets are disc-shaped, wherein the direction of magnetization leads through the thickness of the disc. In a preferred embodiment, the axially magnetized magnets each have a remanence of 1.00 to 1.5 T.

In a preferred embodiment, the disk comprises a passive RFID transponder or an active RFID transponder. The provision of an RFID transponder allows not only to have a magnetic field acting in a specific direction to act on the second sensor by means of the disk, but also to provide information readable by the first sensor. On the one hand, this information can consist solely of information of belonging to a system according to the invention. It is conceivable that the control unit of the toy only processes the signals generated by the second sensor or derives control commands from them if the first sensor simultaneously derives specific information from the passive or active RFID transponder provided in the disk. For example, it can be provided that without the presence of an RFID transponder in the disk and thus a corresponding signal of the first sensor, the control unit does not process the signals of the second sensor. Alternatively, the presence of the RFID transponder can be used to trigger specific programs in the control unit. For example, it is conceivable to carry out various games with the toy by means of the disk. By means of specific codings of the respective RFID transponder, the toy can be informed to which game the respective disk belongs.

In a preferred embodiment, an identifier carrier, which has a property that the first sensor can detect, namely comprises a passive RFID transponder or an active RFID transponder, is provided within the system according to the invention in addition to the magnet carrier, in particular in addition to the disk. This makes it possible to implement the functionality known from WO 2015/104222 A1 by means of the toy according to the invention. If, instead of the magnet carrier, in particular instead of the disk, the identifier carrier is placed on the support the first sensor can read its passive RFID transponder or its active RFID transponder and use this information to identify a file whose audio information the control unit is to play via the loudspeaker or the loudspeaker connection, as described in WO 2015/104222 A1. In such an application, the magnet carrier, in particular the disk, would be present within the system, but would not be placed on the support in the specific operating situation. It is also possible to create operating situations in which both the magnet carrier, in particular the disk, and the identifier carrier are present. For example, it is conceivable that the disk is placed on the support and the identifier carrier is placed on the disk.

In a further embodiment, the system can comprise the magnet carrier and the identifier carrier, wherein the magnet carrier and the identifier carrier are placed together on the toy. In this way, the versatility of the system can be increased. For example, a program can be started by means of the identifier carrier, wherein the program can be controlled by means of the magnet carrier. In this way, the versatility of the system can be further increased by being able to use different programs with the magnet carrier and a variety of identifier carriers. For example, games can also be played. Furthermore, the magnet carrier can comprise an RFID transponder. Thus, the toy can select a program or a story by means of the RFID transponder of the magnet carrier or by means of the combination of the RFID transponder of the identifier carrier and the RFID transponder of the magnet carrier. The magnet carrier and the identifier carrier can be designed so that the identifier carrier can surround the magnet carrier. In this way, the operation of the system can be facilitated, as the positioning of the magnet carrier in relation to the identifier carrier can be facilitated.

In a further embodiment, the magnet carrier and/or the identifier carrier can comprise an actuating element. In this way, the functionality and versatility of the system can be increased. The actuating element can for example be a button or an adjusting wheel. For example, the RFID transponder can be connected to the actuating element, wherein in particular the actuating element can be configured such that the actuating element can influence the communication of the RFID transponder with the first sensor. For example, the communication between the RFID transponder and the first sensor can be influenced by pressing the actuating element.

In a further embodiment, the information on the RFID transponder of the disk and/or the identifier carrier can be changed. Additionally or alternatively, the file that can be assigned to the information on the RFID transponder can be changed. In this way, the versatility of the system can be easily increased. For example, program codes can be stored as information on the RFID transponder and/or on the file that can be assigned to the information on the RFID transponder. By the storing of program codes, the versatility of the system can be further increased, since, for example, additional games can be programmed. A program code can for example be Google Blockly.

In a preferred embodiment, within the system

- a first magnet carrier, in particular a first disc, is provided, wherein the first magnet carrier has a rotation axis about which it can rotate and comprises a radially magnetized magnet in which the magnetic axis of the magnet is perpendicular to the rotation axis and a second magnet carrier, in particular a second disc, is provided, wherein the second magnet carrier has a rotation axis about which it can rotate and comprises a radially magnetized magnet in which the magnetic axis of the magnet is perpendicular to the rotation axis.

The provision of a first magnet carrier and a second magnet carrier allows different forms of interaction with the toy.

In a preferred embodiment, the first disk and the second disk each comprise a passive RFID transponder or an active RFID transponder. The provision of an RFID transponder allows not only to have a magnetic field acting in a specific direction to act on the second sensor by means of the disk, but also to provide information readable by the first sensor. In this way, it can be detected by the first sensor which disk is placed on the toy. Depending on the disk, the control unit can control the loudspeaker or the loudspeaker connection and/or an LED ring, if present, in different ways.

In a preferred embodiment, the outline of the magnet carrier, in particular the outline of the disk is circular, elliptical or polygonal, particularly preferably pentagonal, hexagonal or octagonal, in a plan view along the rotation axis. In a preferred embodiment of the embodiment with a first magnet carrier and a second magnet carrier, the outline of the first magnet carrier in a plan view along the rotation axis is different from the outline of the second magnet carrier in a plan view along the rotation axis.

In a preferred embodiment of the embodiment with a first magnet carrier and a second magnet carrier.

the first magnet carrier comprises a bottom side and a top side, wherein the bottom side is intended to place the first magnet carrier on the support, the second magnet carrier comprises a bottom side and a top side, wherein the bottom side is intended to place the second magnet carrier on the support, wherein the bottom side of the first magnet carrier has the same shape as the bottom side of the second magnet carrier and is particularly preferably flat and wherein the top side of the first magnet carrier is shaped differently than the top side of the second magnet carrier. For example, the top side of the first magnet carrier can be flat like the bottom side of the first magnet carrier, while the top side of the second magnet carrier is wavy or has a protruding pin.

The method according to the invention for operating a system according to the invention provides that.

the second sensor determines the direction of a magnetic field acting on the second sensor and generated by the radially magnetized magnet relative to a preferred direction, and the control unit controls the loudspeaker or the loudspeaker connection to play back music or a spoken story on the basis of the direction, determined by the second sensor, of the magnetic field acting on the second sensor and generated by the radially magnetized magnet relative to a preferred direction.

In a preferred embodiment, the content of the music or the spoken story, for the playback of which the control unit controls the loudspeaker or the loudspeaker connection, depends on the direction, determined by the second sensor, of the magnetic field acting on the second sensor and generated by the radially magnetized magnet relative to the preferred direction. In this way, for example, in the case of a first direction, a music or a spoken story with a first content and, in the case of a second direction different from the first, a music or a spoken story with a second content different from the first can be played back.

In a preferred embodiment, the method is performed at a toy in which the support of the toy is enclosed by an LED ring comprising an LED. In the preferred embodiment, the control unit controls an LED of the LED ring on the basis of the direction, determined by the second sensor, of the magnetic field acting on the second sensor and generated by the radially magnetized magnet relative to a preferred direction. The LED ring can comprise several LEDs which are controlled differently in the case of a specific direction.

In a preferred embodiment, the type of the controlling of the LED depends on the direction, determined by the second sensor, of the magnetic field acting on the second sensor and generated by the radially magnetized magnet relative to the preferred direction. In this way, for example, in the case of a first direction, the LED can be controlled and, in the case of a second direction different from the first, the LED may not be controlled. Or, for example, in the case of a first direction, the LED can be controlled to emit light of a first color and, in the case of a second direction different from the first, the LED can be controlled to emit light of a second color different from the first.

For selecting the content of the music or the spoken story for the playback of which the control unit can control the loudspeaker or the loudspeaker connection, in a preferred embodiment, an orientation for the direction of a magnetic field acting on the second sensor and generated by the radially magnetized magnet relative to a preferred direction can be indicated by at least one LED of the LED ring. This makes it particularly easy to indicate an orientation for the direction of a magnetic field acting on the second sensor and generated by the radially magnetized magnet relative to a preferred direction. An orientation can be a specification by means of which the direction of a magnetic field acting on the second sensor and generated by the radially magnetized magnet can be oriented or aligned relative to a preferred direction. To indicate an orientation, for example, a marking on a magnet carrier can be aligned with the at least one LED of the LED ring.

In particular, the direction of the magnetic field acting on the second sensor and generated by the radially magnetized magnet relative to a preferred direction can be oriented with respect to the at least one LED of the LED ring, in particular as orientation. Preferably, in particular as an alignment, the direction of a magnetic field acting on the second sensor and generated by the radially magnetized magnet relative to a preferred direction can be aligned with the at least one LED of the LED ring. For example, the magnetic field generated by the radially magnetized magnet can be aligned with a defined position in relation to the at least one LED by rotating the magnet carrier in order to be able to select the content of the music or the spoken story. In this way, the method can be particularly easy to handle and operate. In addition, the data input for the selection of the content of the music or the spoken story can be particularly simple and fast. This can make the method particularly efficient.

For example, information data on a further information means can be assigned to the orientation, wherein the information data on the further information means can be transferred to the toy by orienting the direction of a magnetic field acting on the second sensor and generated by the radially magnetized magnet relative to a preferred direction with respect to the at least one LED of the LED ring or to the at least one LED of the LED ring. In this way, particularly easy handling and operation can be achieved with the method. In addition, the data input of information data of the further information means for the selection of the content of the music or the spoken story can be particularly simple and fast. This makes the method particularly efficient.

The at least one LED of the LED ring can indicate the orientation for example by means of at least one color and/or a clocking. For example, several LEDs of the LED ring can indicate different possible orientations so that the selection options of the method can be increased. In this way, more complex information data can be transmitted so that the process can be more efficient. The clocking of the LED can be the frequency at which the LED can be switched on and off.

In a preferred embodiment, the method is carried out on a system with a magnet carrier that comprises a passive RFID transponder or active RFID transponder. In a preferred embodiment, the content of the music or the spoken story, for the playback of which the control unit controls the loudspeaker or the loudspeaker connection, depends on

- the direction, determined by the second sensor, of the magnetic field acting on the second sensor and generated by the radially magnetized magnet relative to the preferred direction
- and
- information that the first sensor reads from the passive RFID transponder or the active RFID transponder.

In a preferred embodiment, the method is carried out on a system with

- a first magnet carrier, which comprises a first passive RFID transponder or first active RFID transponder,
- and
- a second magnet carrier, which comprises a second passive RFID transponder or first second RFID transponder.

In a preferred embodiment, the content of the music or spoken story, for the playback of which the control unit controls the loudspeaker or the loudspeaker connection, depends on

- the direction, determined by the second sensor, of the magnetic field acting on the second sensor and generated by the radially magnetized magnet relative to the preferred direction and on whether the first sensor recognizes the first passive RFID transponder or first RFID transponder or second passive RFID transponder or first second RFID transponder.

In one embodiment, the method can be carried out by means of a system with the magnet carrier and the identifier carrier, wherein the magnet carrier and the identifier carrier can be placed together on the toy. In this way, the versatility of the method can be increased. For example, a program can be started by means of the identifier carrier, wherein the program can be controlled by means of the magnet carrier. In this way, the versatility of the method can be further increased by being able to use different programs with the magnet carrier and a variety of identifier carriers. For example, also games can be played. Furthermore, the magnet carrier can also comprise an RFID transponder. Thus, in the method, the toy can select a program, for example, by means of the RFID transponder of the magnet carrier or by means of the combination of the RFID transponder of the identifier carrier and the RFID transponder of the magnet carrier. The identifier carrier can be placed around the magnet carrier. In this way, the method can be facilitated, as the positioning of the magnet carrier in relation to the identifier carrier can be facilitated.

In a further embodiment of the method, an actuating element of the magnet carrier and/or the identifier carrier can be actuated. In this way, the functionality and versatility of the method can be increased. An actuating element can for example be a button or an adjusting wheel. For example, the RFID transponder can be connected to the actuating element, wherein the communication of the RFID transponder with the first sensor can be influenced by actuating the actuating element. For example, the communication between the RFID transponder and the first sensor can be influenced by pressing the actuating element.

Below, the invention is explained with reference to a drawing merely illustrating embodiments of the invention in more detail.

Therein,

Figure 1:
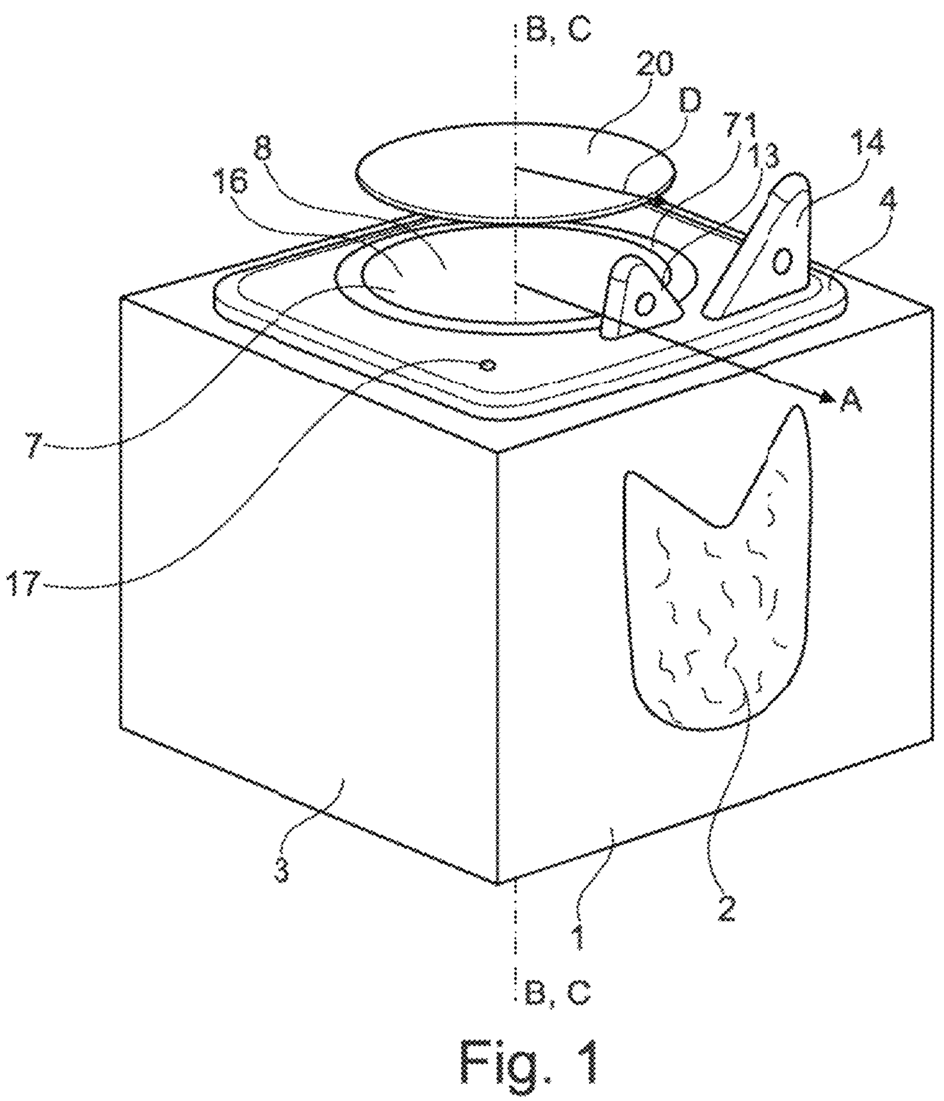
FIG. 1 shows a schematic, perspective view of a system with a toy and a disk.
Figure 2:
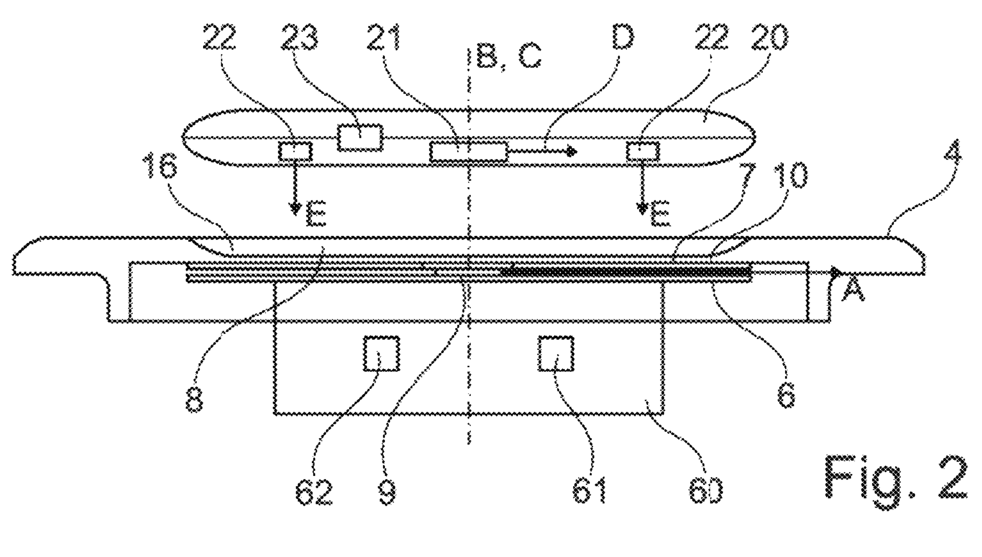
FIG. 2 shows a sectional side view of a head plate of the toy of the system according to FIG. 1 and a sectional side view of the disk of the system according to FIG. 1.

FIG. 1 shows a toy 1 for playing back music or a spoken story. In the embodiment shown in FIG. 1, the toy 1 is cube-shaped and comprises a loudspeaker 2 on a side wall.

At its side walls and at parts of its top side and bottom side (bottom side not visible in the perspective of FIG. 1), the toy comprises a casing 3 made of foamed material which is surrounded by a leather skin. In the area of the loudspeaker 2, the casing 3 comprises holes through which the sound waves can better escape to the outside.

Figure 11:
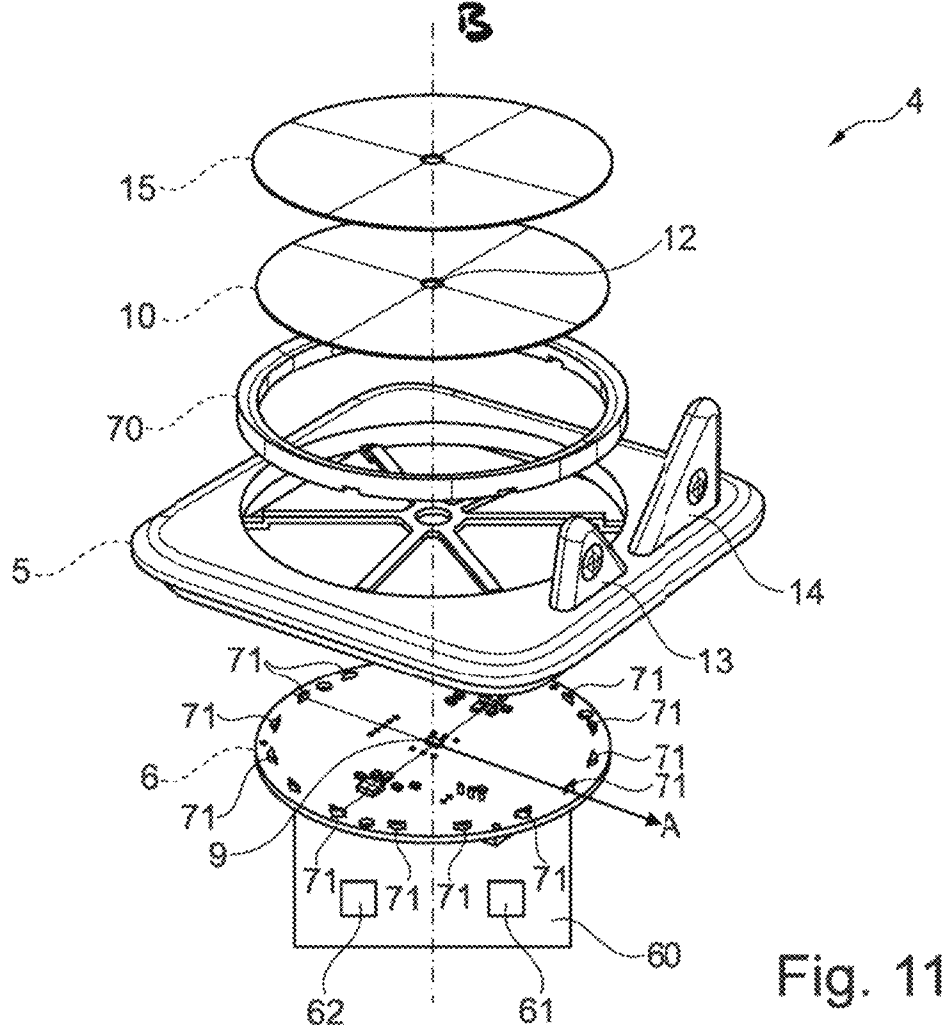
FIG. 11 shows an exploded view of the structure of a head plate of a toy of the system.
Figure 12:
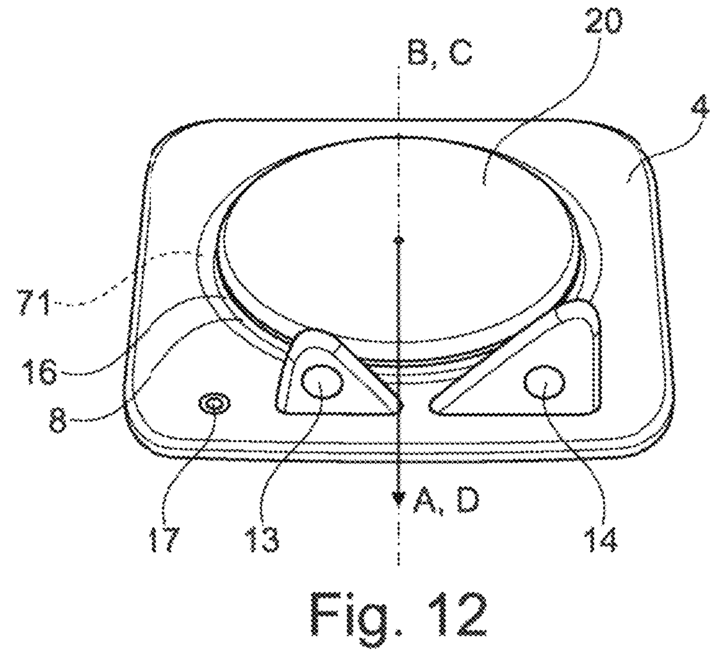
FIG. 12 shows a schematic, perspective view at a head plate of the toy of the system in the embodiment according to FIG. 9 with a disk inserted into a hollow of the head plate.

At the top side of the toy 1, a head plate 4 is inserted into a recess of the casing 3. A possible structure of a head plate 4 is shown in the exploded view of FIG. 11. The head plate 4 comprises a frame 5. Below the frame 5, a second circuit board 6 in the form of a "printed circuit board" (PCB) is provided. A first circuit board 60 is arranged below the second circuit board 6 and at an angle of 90° to the second circuit board 6. On the first circuit board 60, the evaluation unit 61 of a first sensor is arranged, wherein the first sensor can detect, within an area of its environment, a property or a change in a property of this environment, wherein the first sensor is a reader for communicating with a passive RFID transponder and/or for communicating with an active RFID transponder. The first sensor comprises an antenna not shown in detail and the evaluation unit. The antenna can be ring-shaped and embedded in the frame 5 such that the antenna is circumferential around the support 8, in particular circumferential around the hollow 16. On the circuit board 60, further, a control unit 62 is provided, which can control the loudspeaker 2 to play back music or a spoken story if the first sensor detects, within the area of its environment, a specific property or a specific change in a property of this environment or if the control unit 62 detects a specific change in the property detected by the first sensor.

The control unit 62 can comprise a TI CC3200 microcontroller with 80 MHz and 256 kB RAM as processor as well as a flash memory ISSI IS25LQ032B 4 MB and a memory SanDisk Edge 8 GB as well as a DAC/amplifier: TI TLV320DAC3100 and an acceleration sensor NXP MMA8451Q.

On the circuit board 6, a second sensor 9 is provided, which can determine the direction of a magnetic field acting on the second sensor relative to a preferred direction A. In the embodiments shown here, the preferred direction A runs parallel to the base surface 7 of a support 8 provided in the head plate 4. The preferred direction A runs perpendicular and thus radially to a rotation axis B. In the embodiment shown here, the second sensor 9 is a Hall sensor. The preferred direction A is a feature resulting from the structure of the Hall sensor. The position of the preferred direction A relative to the circuit board 6 depends on the orientation with which the Hall sensor is applied to the circuit board 6. The position of the preferred direction A relative to other components of the head plate 4, e.g. relative to the frame 5 or, for example, relative to operating elements 13, 14 provided on the frame 5, depends on the orientation with which the circuit board 6 is installed in the frame 5. In the design shown in FIG. 11, the Hall sensor is mounted on the circuit board 6 and the circuit board 6 is mounted in the frame 5 such that the preferred direction A runs below the two operating elements 13, 14, between these two.

The second sensor 9 is arranged centrically on the circular disk-shaped circuit board 6. The rotation axis B runs through the second sensor B and intersects the circular disk-shaped circuit board 6 at its center.

The head plate 4 also contains the light guide ring 71 of an LED ring. This comprises individually controllable LEDs 70. Further, the individual LEDs 70 are individually controllable so that the color of the light emitted by the respective LED 70 is individually controllable. The LEDs 70 of the LED ring can be controlled by the control unit 62 on the circuit board 6. The LED 70 are arranged on the circuit board 6 and below the light guide ring 71 and radiate the light generated by them into the light guide ring 71, which transports this light from the LED 70 below the support 8 into the area of the support 8, so that it is visible in the top view at the head plate 8.

The head plate 4 further comprises a circular disk-shaped metal plate 10. A hole 12 is provided in the center of the metal plate 10. The relative arrangement of the metal plate 12 to the second sensor 9 is selected such that the second sensor 9 is arranged below the hole 12. As a result, a magnetic field generated by a disk 20 arranged above the metal plate 10 can be better perceived by the second sensor 9. In an alternative embodiment, the second sensor 9 is not arranged below the hole 12 of the metal plate 10, but in the hole 12 of the metal plate 10. The relative position of the metal plate 10 to the second sensor 9 can be adjusted by attaching the metal plate 10 to the frame 5 and by attaching the second sensor 2 to the circuit board 6 and by attaching the circuit board 6 to the frame 5.

The head plate 4 further has a sticker 15 glued to the top of the metal plate 10.

The operating elements 13, 14 are connected to the control unit on the circuit board 6 and can generate control commands that are implemented by the control unit on the circuit board 6. For example, by means of the operating elements 13, 14, the volume of the playback of the music or the spoken story can be adjusted.

Figure 9:
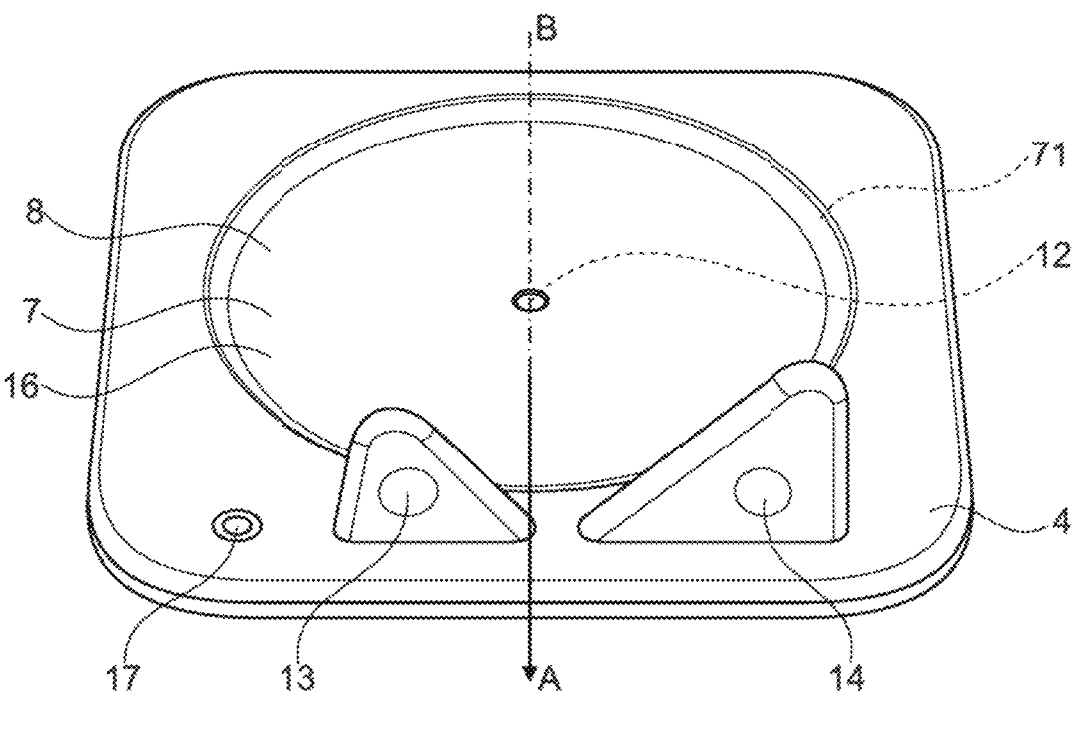
FIG. 9 shows a schematic, perspective view at a head plate of the toy of the system in a further embodiment.

The toy 1 comprises a support 8. This support 8 can be part of a hollow 16 formed in the head plate 4. For example, the support 8 is formed by the base surface 7 of the hollow 16 (see, for example, FIG. 9). The provision of a hollow 16 facilitates the positioning of the disk 20 on the support 8, especially if the diameter of the hollow 16 has only a slight oversize in relation to the diameter of the disk 20.

However, as FIGS. 5 to 8 show, other designs of the support 8 and the disk 20 are also possible. FIGS. 1, 2, 5 to 8 and 12 show the disk 20 in an arrangement on the support 8, in which a magnetic axis D of the magnet is in alignment with the preferred direction A. By turning the disk 20 about the rotation axes C, the relative position of the magnetic axis D relative to the preferred direction A can be changed. The second sensor 9 designed as a Hall sensor can determine the position of the magnetic axis D relative to the preferred axis A.

Figure 3:
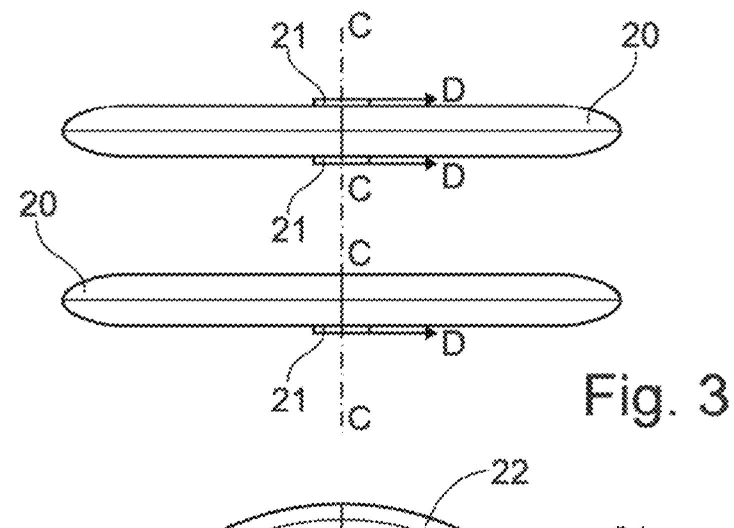
FIG. 3 shows schematic side views of two possible embodiments of disks which can be used in a system according to FIG. 1.
Figure 4:
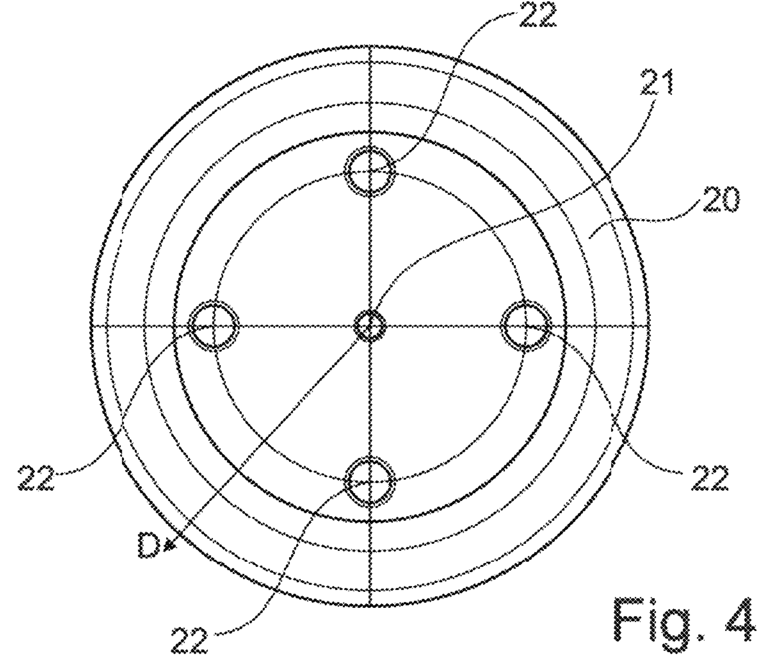
FIG. 4 shows a view from below at a disk which can be used in a system according to FIG. 1.
Figures 5, 6, 7:
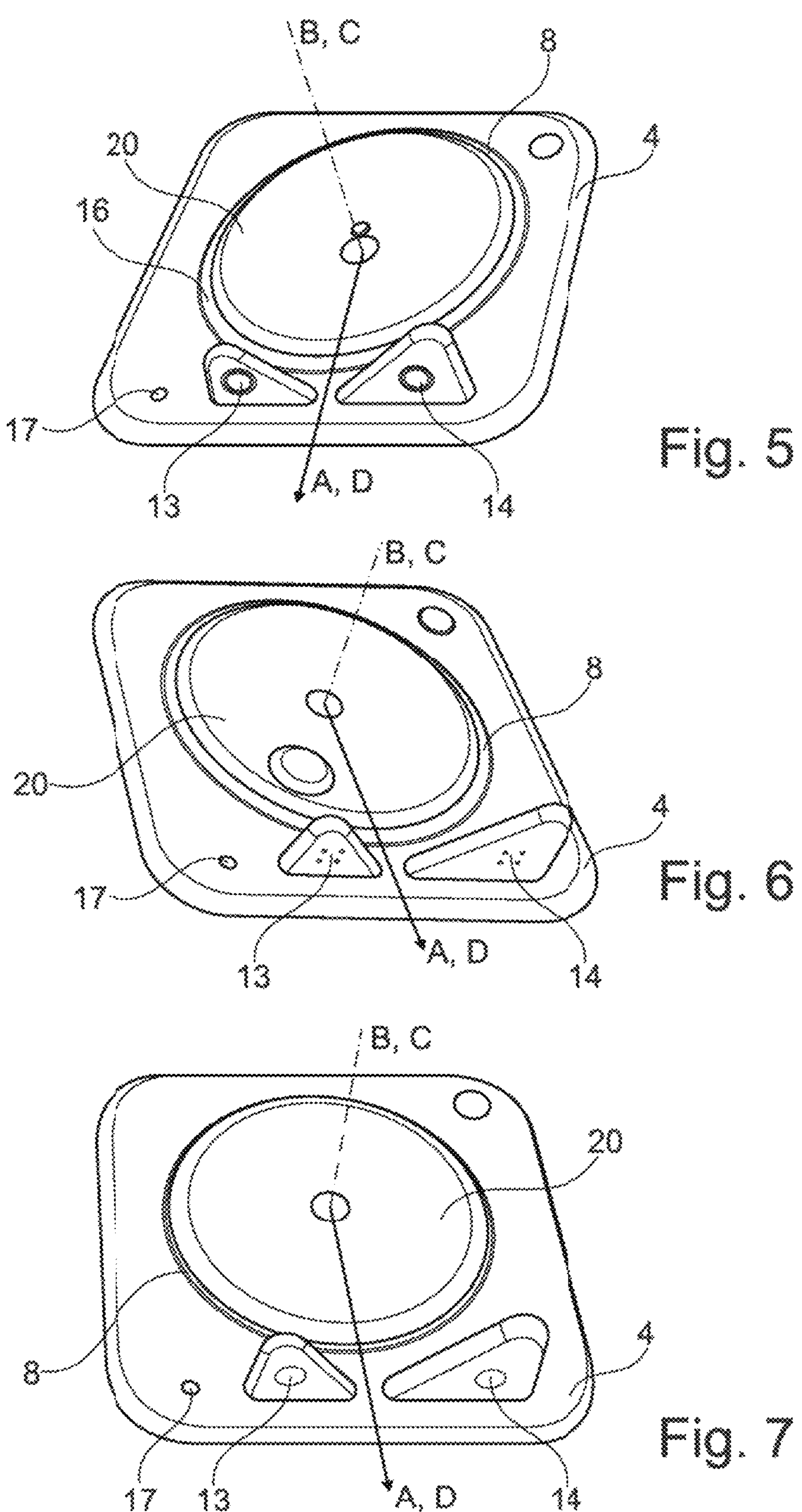
FIG. 5 shows a schematic, perspective view at a head plate of the toy of the system and of a disk of the system placed on the head plate in a first embodiment.
FIG. 6 shows a schematic, perspective view at a head plate of the toy of the system and of a disk of the system placed on the head plate in a second embodiment.
FIG. 7 shows a schematic, perspective view at a head plate of the toy of the system and of a disk of the system placed on the head plate in a third embodiment.
Figure 8:
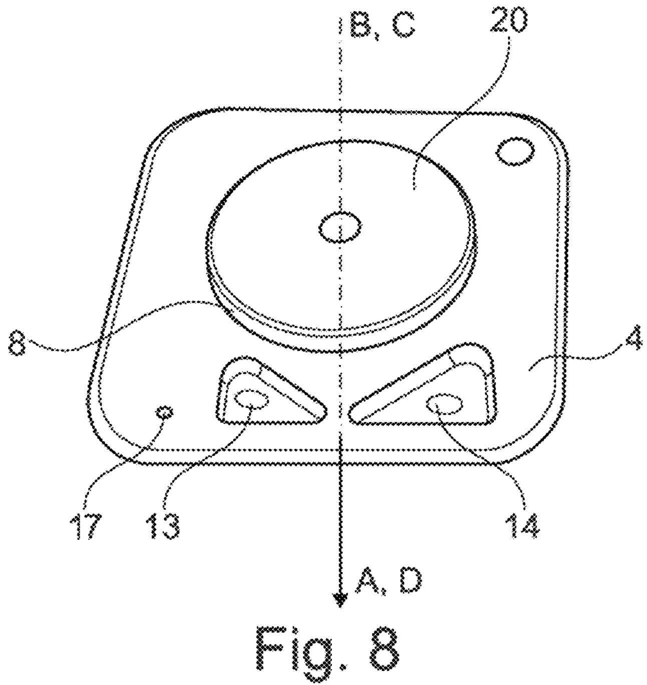
FIG. 8 shows a schematic, perspective view at a head plate of the toy of the system and of a disk of the system placed on the head plate in a fourth embodiment.
Figure 10:
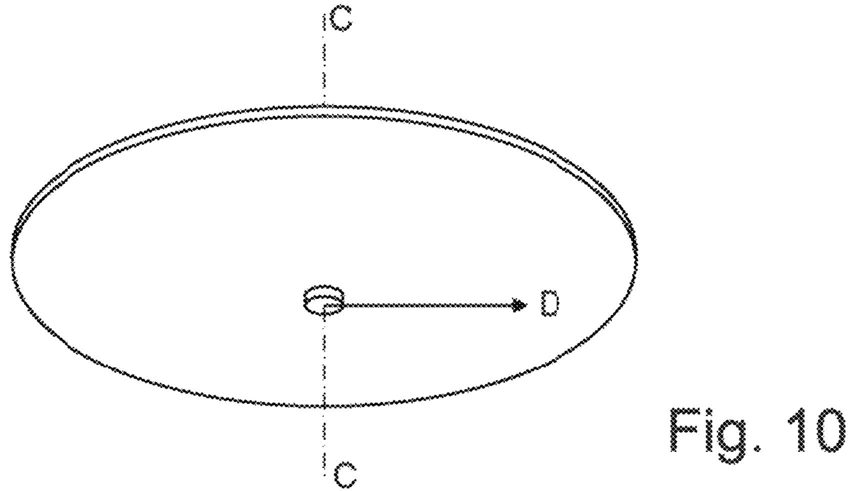
FIG. 10 shows a schematic, perspective view at a disk of the system from below.

The toy 1 can be part of a system which, in addition to the toy 1, also comprises a disk 20. The disc 20 has a rotation axis C and a radially magnetized magnet 21, in which the magnetic axis D of the magnet 21 is perpendicular to the rotation axis C (see, for example, FIGS. 3, 4, 10).

In addition to the radially magnetized magnet 21, the disc 20 comprises four further, but axially magnetized magnets 22, whose respective magnetic axis E runs parallel to the rotation axis C of the disc 20. The disk 20 can be held on the metal plate 10 by the magnetic effect of the magnets 22.

In the head plate 4, a headphone connection 17 is provided.

In the disk 20, a passive RFID transponder 23 is provided, which can be read by the first sensor.

Figure 13:
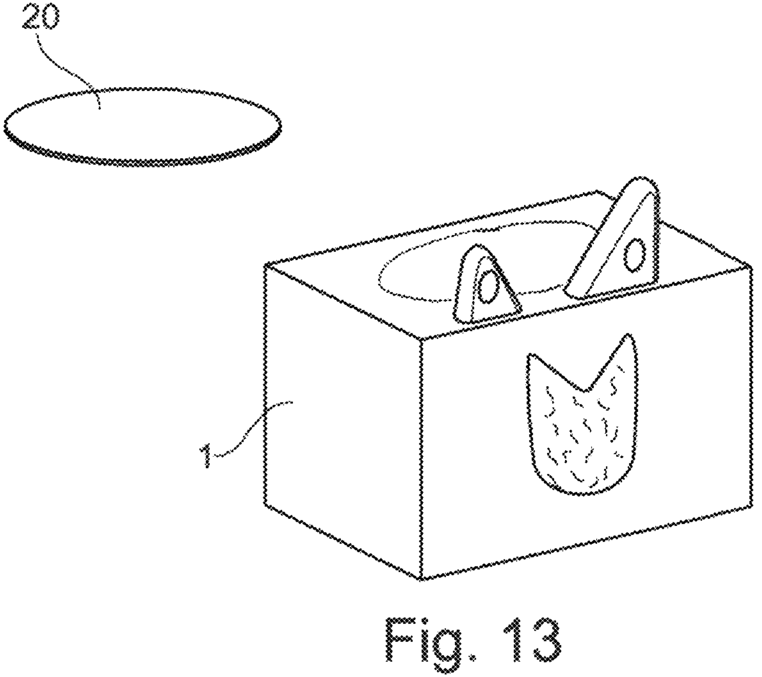
FIG. 13 shows a schematic view of a system according to the invention with a toy, a disk and an identifier carrier.
Figure 13:
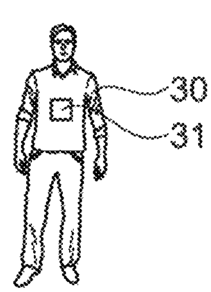

FIG. 13 shows that the system of toy 1 and disk 20 shown in FIG. 1 can be extended by an identifier carrier 30 in the form of a toy figure. In the identifier carrier 30, a passive RFID transponder is provided, which can be read by the first sensor.

The system according to the invention can be operated, for example, such that a first disk 20 with a first RFID transponder 23 is placed on the support 8. The first sensor recognizes the RFID transponder 23 and sends a corresponding signal to the control unit 61. The control unit 61 then calls up a program routine stored in it or in a memory. As part of the program routine, the loudspeaker 2 is controlled to play back a sentence and, for example, an LED 70 of the LED ring is controlled with a specific color. For example, the LED can be controlled with the color red, and the loudspeaker can be controlled to output the story "Turn the disc to the red light". If the operator now turns the disc so that the direction of the magnetic field, acting on the second sensor 9, of the radially magnetized magnet 21 takes a predetermined position relative to a preferred direction A (which is recognized by the second sensor 9), the control unit 61 can control the loudspeaker 2 on the basis of a corresponding signal of the second sensor 9 to play back the story: "That's right, now you have oriented the disc correctly".

When using a different disc with a different RFID transponder, the operator can be prompted to rotate the disc as quickly as possible, wherein it is determined by means of the second sensor how often the magnetic field of the radially magnetized magnet 21 takes the preferred direction A within a predetermined unit of time.

When using a different disk with a different RFID transponder, the operator can be prompted to bring the disk into a specific sequence of relative positions, for example in the manner of opening a safe.

Figure 14:
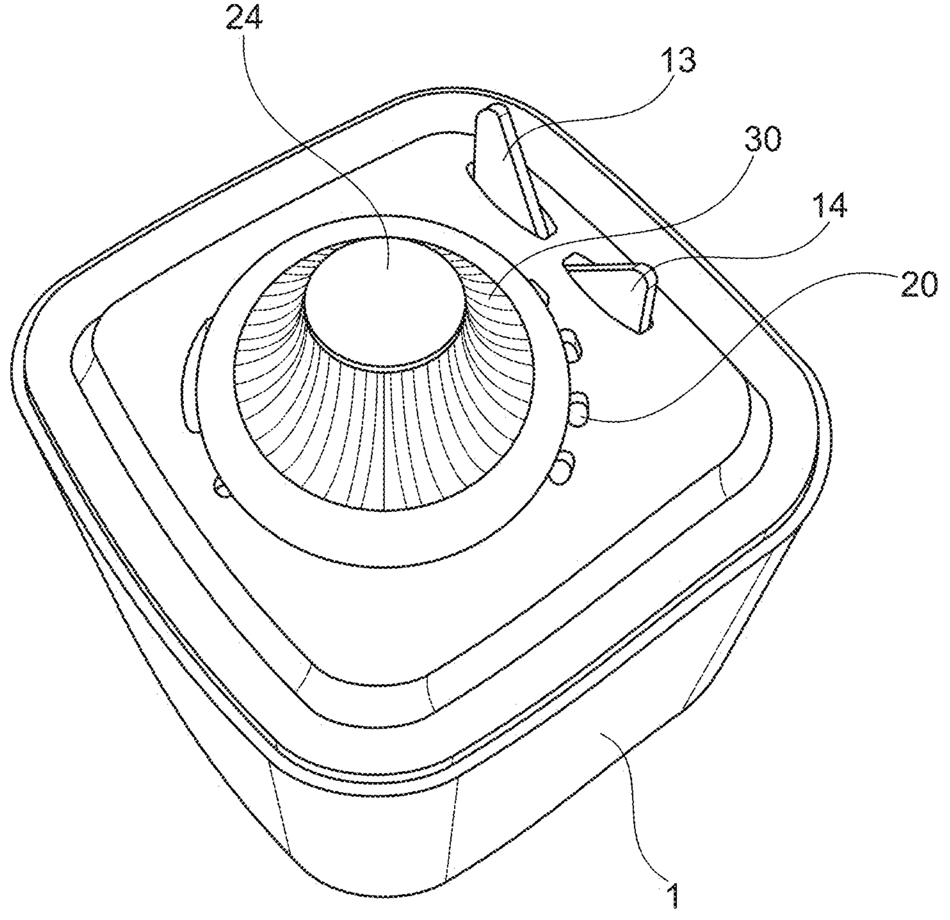
FIG. 14 shows a schematic view of a system according to the invention with a toy, a disk and an identifier carrier.

FIG. 14 shows a schematic view of a system according to the invention with a toy 1, a magnet carrier 20 in the form of a disk 20 and an identifier carrier 30. The disk 20 and the identifier carrier 30 are placed together on the toy 1. A program is started by means of the identifier carrier 30, wherein the program is controlled by means of the disk 20. The disk 20 also comprises an RFID transponder 23. The disk 20 and the identifier carrier 30 are designed such that the identifier carrier 30 surrounds the disk 20.

In addition, the magnet carrier 20 in the form of a disk 20 comprises an actuating element 24. It is also conceivable that the identifier carrier 30 comprises an actuating element 24. The actuating element 24 is a button. The RFID transponder 23 is connected to the actuating element 24, wherein the actuating element 24 is configured such that the actuating element 24 influences the communication of the RFID transponder 23 with the first sensor. In the embodiment shown in FIG. 14, the communication between the RFID transponder 23 and the first sensor is influenced by pressing the actuating element 24.

The invention claimed is:

1. System comprising a toy (1) for playing back music or a spoken story—with a loudspeaker (2) and/or a loudspeaker connection, a first sensor which can detect, within an area of its environment, a property or a change in a property of this environment, wherein the first sensor is a reader for communicating with a passive RFID transponder (31) and/or for communicating with an active RFID transponder, and a control unit (62) which can control the loudspeaker (2) or the loudspeaker connection to play back music or a spoken story if the first sensor detects, within the area of its environment, a specific property or a specific change in a property of this environment or if the control unit (62) detects a specific change in the property detected by the first sensor, characterized by a second sensor (9) which can determine the direction of a magnetic field acting on the second sensor (9) relative to a preferred direction wherein the system further comprises a magnet carrier, wherein the magnet carrier has a rotation axis (C) about which it can rotate and comprises a radially magnetized magnet (21), in which the magnetic axis (D) of the magnet (21) is perpendicular to the rotation axis (C).

2. System according to claim 1, characterized by a support (8) of the toy, wherein the second sensor (9) is arranged below the support (8).

3. System according to claim 2, characterized in that the support (8) is part of a hollow (16).

4. System according to claim 2, characterized in that the support (8) comprises a recess or dent and the second sensor (9) is arranged in alignment with the recess or dent below the support (8).

5. System according to claim 2, characterized in that a metal plate (10) of the toy is arranged below the support (8).

6. System according to claim 2, characterized in that the support (8) is enclosed by an LED ring.

7. System according to claim 1, characterized by a circuit board (6) of the toy, wherein the first sensor and the second sensor (9) and the control unit are arranged on the circuit board (6).

8. System according to claim 1, characterized in that the magnet carrier comprises, in addition to the radially magnetized magnet (21), at least one axially magnetized magnet (22) whose magnetic axis (E) runs through the rotation axis or parallel to the rotation axis (C).

9. System according to claim 1, characterized in that the magnet carrier comprises a passive RFID transponder (23) or active RFID transponder.

10. System according to claim 1, characterized by an identifier carrier (30) provided in addition to the magnet carrier, wherein the identifier carrier (30) has a property that the first sensor can detect, namely comprises a passive RFID transponder (31) or active RFID transponder.

11. Method for operating a system according to claim 1, characterized in that the second sensor (9) determines the direction of a magnetic field acting on the second sensor (9) and generated by the radially magnetized magnet (21) relative to a preferred direction (A), and the control unit (62) controls the loudspeaker (2) or the loudspeaker connection to play back music or a spoken story on the basis of the direction, determined by the second sensor (9), of the magnetic field acting on the second sensor (9) and generated by the radially magnetized magnet (21) relative to a preferred direction (A).

12. Method according to claim 11, characterized in that the support (8) of the toy is enclosed by an LED ring comprising an LED (70) and the control unit (62) controls an LED (70) of the LED ring on the basis of the direction, determined by the second sensor (9), of the magnetic field acting on the second sensor (9) and generated by the radially magnetized magnet (21) relative to a preferred direction (A).

13. Method of using a magnet carrier, comprising forming a system according to claim 1 with a magnetic carrier, wherein the magnet carrier has a rotation axis (C) about which it can rotate and comprises a radially magnetized magnet (21) in which the magnetic axis (D) of the magnet (21) is perpendicular to the rotation axis (C).

14. System according to claim 1, characterized in that the second sensor (9) is a Hall sensor.

* * * * *